United States Patent
Herring et al.

(12)
(10) Patent No.: US 6,542,502 B1
(45) Date of Patent: Apr. 1, 2003

(54) MULTICASTING USING A WORMHOLE ROUTING SWITCHING ELEMENT

(75) Inventors: Jay Robert Herring, Kingston, NY (US); Craig Brian Stunkel, Bethel, CT (US); Rajeev Sivaram, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/592,280

(22) Filed: Jan. 26, 1996

(51) Int. Cl.[7] .............................................. H04L 12/28
(52) U.S. Cl. ........................ 370/390; 370/428; 370/432
(58) Field of Search ................................. 370/390, 442, 370/429, 413, 392, 393, 409, 230–236, 363–383, 389, 432, 428

(56) References Cited

U.S. PATENT DOCUMENTS

| | | | | |
|---|---|---|---|---|
| 4,488,288 A | * | 12/1984 | Turner | 370/393 |
| 4,734,907 A | * | 3/1988 | Turner | 370/390 |
| 4,878,218 A | * | 10/1989 | Takada | 370/412 |
| 5,319,360 A | * | 6/1994 | Schrodi et al. | 370/390 |
| 5,365,519 A | * | 11/1994 | Kozaki et al. | 370/390 |
| 5,477,541 A | * | 12/1995 | White et al. | 370/392 |
| 5,515,428 A | * | 5/1996 | Sestak et al. | 370/412 |
| 5,546,391 A | * | 8/1996 | Hochschild | 370/412 |
| 5,602,841 A | * | 2/1997 | Lebizay et al. | 370/413 |
| 5,659,796 A | * | 8/1997 | Thorson et al. | 370/409 |

* cited by examiner

Primary Examiner—Steven Nguyen
(74) Attorney, Agent, or Firm—F. Chau & Associates, LLP

(57) ABSTRACT

The invention is a replication method that requires only one copy of a packet entering a multiport switch to be transmitted from the input port, the method acquiring the deadlock avoidance advantages of virtual cut-through operation. The goal is achieved via a central buffer, with replication occurring during the read of the chunk out of the central buffer by the output ports.

17 Claims, 3 Drawing Sheets

MULTICASTING USING A WORMHOLE ROUTING SWITCHING ELEMENT

FIELD OF THE INVENTION

The invention relates to the routing of digital electronic data through network switches.

BACKGROUND OF THE INVENTION

The Problem: Wormhole Routing Multicast Methods Deadlock

In wormhole routing, flow control is performed on units that are smaller than packets: flow-control digits, or "flits". FIG. 1 shows a packet broken down into flits: flit1, flit2, flit3 and last flit.

The header (first flit) of the packet advances immediately through each switching element (switch) unless it is blocked because of contention for an output port, and succeeding flits of the packet advance in pipelined fashion behind the header. This immediate forwarding minimizes the latency per switch. When the packet header is blocked, all flits of the packet are buffered in place until the output port is free. Thus, a single blocked packet may be blocked in place across many switches.

One prior approach for multidestination packet based multicast on unidirectional MINs uses strict wormhole routing. There are two general approaches to replicating a wormhole packet at a switch: synchronous and asynchronous.

Under synchronous replication, a multidestination packet's flit is forwarded (and simultaneously replicated) only if all the required output ports at that stage are free. Note that the required output ports at a stage may belong to more than one switch. If one or more of the required ports at the stage are busy, the packet is blocked in place without replication; replication of the flit to the output ports is done only when all the required output ports become free. The required output ports that are free are reserved although no flit is transmitted to them until the other output ports become free. Thus the various copies of a packet's flit travel together from one stage to the next.

In contrast, under asynchronous replication, a multidestination packet's flit is forwarded to all the required output ports that are free when the flit arrives at a stage in the network. Thus, copies of a packet's flit may travel from one stage of the network to the next at different times. However, the flit cannot be discarded until all the required downstream output ports have received their respective copies of the flit.

If we consider a system adopting strict (pure) wormhole routing consisting of switches that have input buffers of size 1 flit, asynchronous replication does not prove very beneficial since the packet's next flit will be blocked until the input buffer at the switch becomes free (and the input buffer becomes free only when the required but busy output ports become free). So the only benefit that asynchronous replication offers us in such a system over synchronous replication, is that a single flit can be forwarded on the output ports that have been successfully reserved by the packet. If the input buffer is of size f flits, using strict wormhole routing and asynchronous replication, up to f flits may be transmitted to the output ports that the packet has reserved before the packet blocks because of the required but busy output ports. Prior work has shown that hardware tree-based synchronous replication in networks adopting strict wormhole routing leads to deadlock, but suggested solutions to this have been extremely restrictive and inappropriate for variations of wormhole routing that provide more intermediate buffering.

The essential reason that wormhole methods deadlock is that the progress made by each output port at a replicating switch is dependent upon the progress of every other output port participating in the replication. If one output port is blocked or is currently sending another packet, then the flits to be sent by that output port must remain in the input port buffer, blocking subsequent flits from entering the input port. Therefore, free output ports are blocked by busy output ports. Two multicasts can easily block each other. Multicast A could block multicast B in one switch, while simultaneously multicast B is blocking multicast A another switch.

If the entire packet could be buffered at the input port, it would be possible for unblocked output ports to receive and transmit all flits of the packet, and this would decouple the dependence between output ports for this packet. Virtual cut-through (VCT) flow-control provides this guarantee. VCT allows the same low-latency pipelining as wormhole routing, but for VCT a switch only accepts a new packet when that switch can guarantee buffer space for the entire packet.

SP2 Review Buffered Wormhole Routing

The buffered wormhole routing used in IBM's SP2 is a variation of wormhole routing wherein every switch in the network is equipped with a central buffer, as illustrated in FIG. 2.

When packets are blocked at a switch due to a busy output port, the switch attempts to store the packet in this central buffer, thus freeing the links held by the trailing packet flits. There may be enough space in the central buffer to store the entire packet. However, there is no guarantee that a packet arriving at a switch will find enough space in the central buffer to be completely stored. If the central buffer does not have adequate space to store the entire blocked packet, as many as possible of the packet flits are stored in the central buffer and the remainder of the packet is blocked in place. Note that in the absence of contention, packets may propagate through the network just as in a purely wormhole routed network, and the central buffers will remain empty. Alternately, a switch could be configured to force each packet though the central buffer, even when a packet encounters no contention.

Because there is no assurance that the central buffer can store an entire multidestination packet, the central buffer as implemented in SP2 cannot guarantee to prevent multicast deadlock. However, an SP2-like shared central buffer is an extremely attractive resource for packet replication. We will describe improvements to the basic central buffer free-space logic that are similar to virtual cut-through operation. Specifically, these improvements guarantee that any packet admitted to the central buffer can (eventually) be entirely stored. This guarantee effectively decouples the interdependence of the replicated output packets at a switch, eliminating the cause of multicast wormhole routing deadlock.

In the SP2 buffered wormhole implementation of the invention, the central buffer is constructed so as to effectively form a separate FIFO queue of packets for each output port. Each input port can write flits into the buffer, and each output port can read flits. Central buffer space is dynamically allocated to requesting input ports in a fair manner.

A number of flits are buffered into a chunk before being written into the central buffer, and chunks are read from the central buffer before being disassembled into flits again at the reading output port. This reduces the number of central buffer RAM read and write ports required. As an example, in the 8-ported SP2 routing elements, up to 1 flit is received or transmitted at each input port or output port every cycle. An SP2 chunk is 8 flits, and thus the central buffer only requires 1 RAM write port and 1 RAM read port to match the input and output bandwidth of the switch. The central buffer logic maintains a list of free chunk locations. A central buffer write allocates a free chunk, and a read returns a free chunk.

There must be a mechanism—we will call it the next-packet list—to order the packets within each packet queue. Each packet is divided into chunks, and thus there is also a mechanism—the next-chunk list—to order the chunks within a packet. First we describe the next-packet lists.

To record the next-packet linking information, a pointer field is available for each chunk of data: the next-packet (NP[ ]) field. In addition, each output port o maintains first-packet (firstP[o]) and last-packet (lastP[o]) pointers into its packet queue. For this description, all pointers are assumed to be nil when invalid. In the following discussion, we shall assume input port i is writing chunks to output port o.

To record these two types of linking information, two pointer fields are associated with each chunk of data: the next-packet (NP[ ]) field 302 and the next-chunk (NC[ ]) field 304 (see FIG. 3).

In addition, each output port o maintains first-packet (firstP[o]) and last-packet (lastP[o]) pointers into its packet queue, and a first-chunk (firstC[o]) field that points to the next chunk to be read if output port o has not read the last chunk of the current packet. Each input port i maintains a last-chunk (lastC[i]) field that points to the last chunk written by input port i. All pointers are assumed to be nil when invalid. In the following discussion, we shall assume input port i is writing chunks to output port o.

The next-packet list is updated each time the first chunk (the header chunk) of a packet is written. If no packets are currently on the destination output port's packet queue firstP[o]=nil, then firstP[o]←writeloc, where writeloc is the address where the header is written. Otherwise, NP[lastP[o]]←writeloc. The last-packet pointer is updated (lastP[o]←writeloc), and the packet-list is terminated (NP[writeloc]←nil).

The logical structure of a typical output port queue within the central buffer is shown in FIG. 4.

There are two packets shown, each with its associated chunks displayed in a column. The lightly-shaded fields indicate fields that are not currently valid (e.g., next-packet fields are not used except for header chunks).

When a header chunk is read from the central buffer, the next-packet list must also be updated (firstP[o]←NP[readloc]). It should be evident that the order of packets on a queue is entirely determined by the order of header chunk writes.

The next-chunk fields provide a similar linking function between packet chunks. On a write, when a valid last-chunk pointer exists, the central buffer next-chunk location pointed to by last-chunk is updated with the location of the currently written chunk (if lastC[i] nil, then NC[lastC[i]]←writeloc). When an input port writes a chunk, it also updates its last-chunk pointer with the write location (lastC[i]←writeloc). The one exception is a write of the last chunk of a packet: in this case the last-chunk pointer becomes invalid (lastC[i]←nil).

On the output port side, except for when a header chunk is being read, the output port first-chunk field is used to determine the location of the next central buffer chunk read (readloc firstC[o]). For header chunk reads, the first-packet pointer is used (readloc←firstP[o]). On every chunk read, the output port's first-chunk pointer is updated with the associated central buffer next-chunk pointer (firstC[o]←NC[readloc]). If NC[readloc]←nil and this chunk is not the last packet chunk, then the next packet chunk is not yet in the central buffer. In this case the output port becomes suspended (cannot read any more chunks from the central buffer until the next chunk of this packet enters the central queue). During suspension the associated input port's last-chunk pointer also becomes invalid (lastC[i]←nil). When the expected chunk is finally written, the first-chunk pointer is updated with the location of that chunk, unsuspending the output port (firstC[o]←writeloc).

FIG. 5 shows the structure of the queue from FIG. 4 after the first two chunks of the first packet in the queue have been read by the output port.

Note that firstP and firstC have been updated, and firstC is now a valid pointer field required for retrieving the next chunk from the queue.

With only the mechanisms described, an output port may starve (input ports may not be able to forward chunk through the central queue to the output port). Starvation prevention methods are relatively straightforward but will not be described here in order to simplify discussion; the replication methods to be described do not change the nature of this starvation scenario.

SUMMARY OF THE INVENTION

The invention is a method for replicating a packet within a switching unit utilizing wormhole flow control, comprising:

a) receiving a packet to be replicated and forwarded to an output port or ports, the packet containing data and destination address information;
b) storing the packet in a buffer;
c) notifying each target output port that the packet is destined for that output port;
d) forwarding the packet to each predetermined output port when the output port is available;
e) when the packet has been forwarded to each predetermined output port, deleting the packet from the buffer.

DETAILED DESCRIPTION OF THE INVENTION

Shared Central Buffer Replication Method

Figure 1:
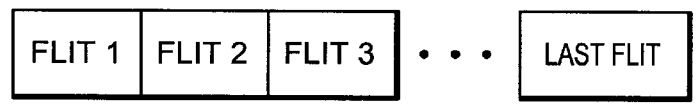
FIG. 1 is a packet broken into flits.
Figure 2:
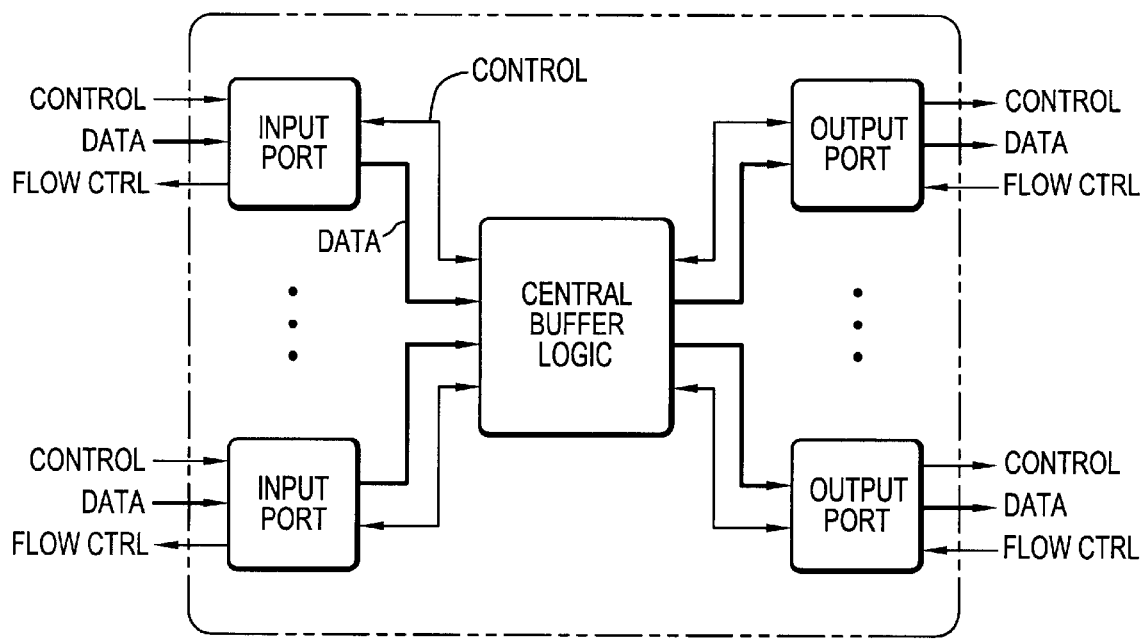
FIG. 2 is an SP2 switch, equipped with a central buffer.
Figure 3:
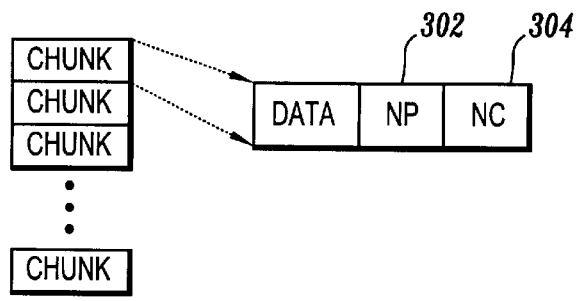
FIG. 3 shows an organization of the SP2 central buffer.
Figure 4:
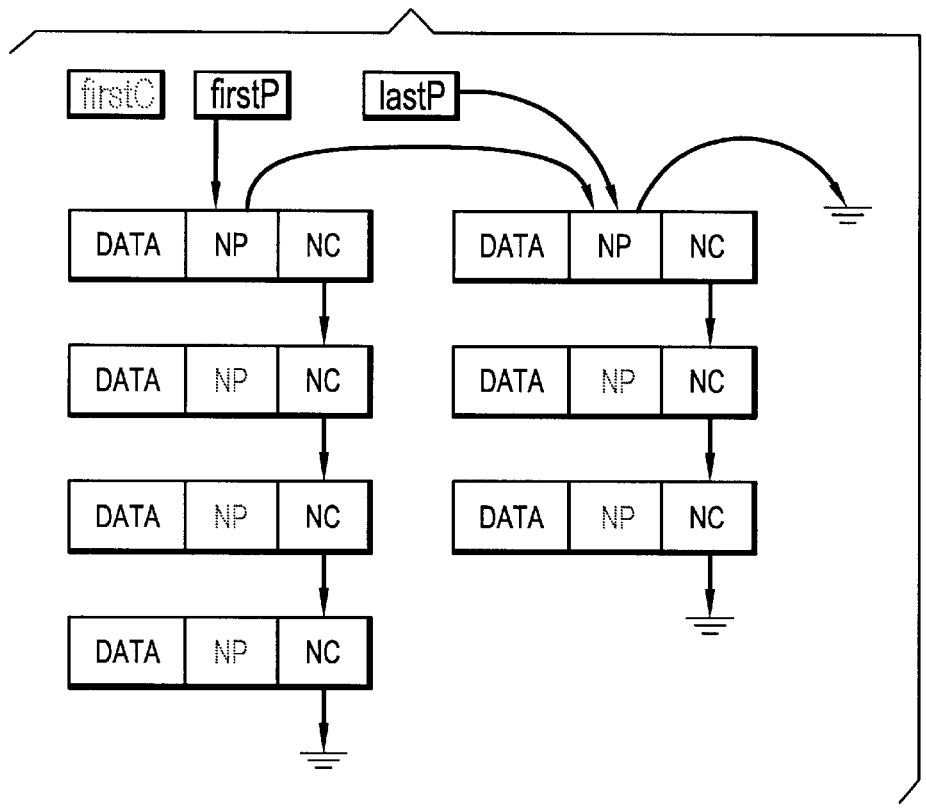
FIG. 4 shows the structure of an output port queue within a central buffer.
Figure 5:
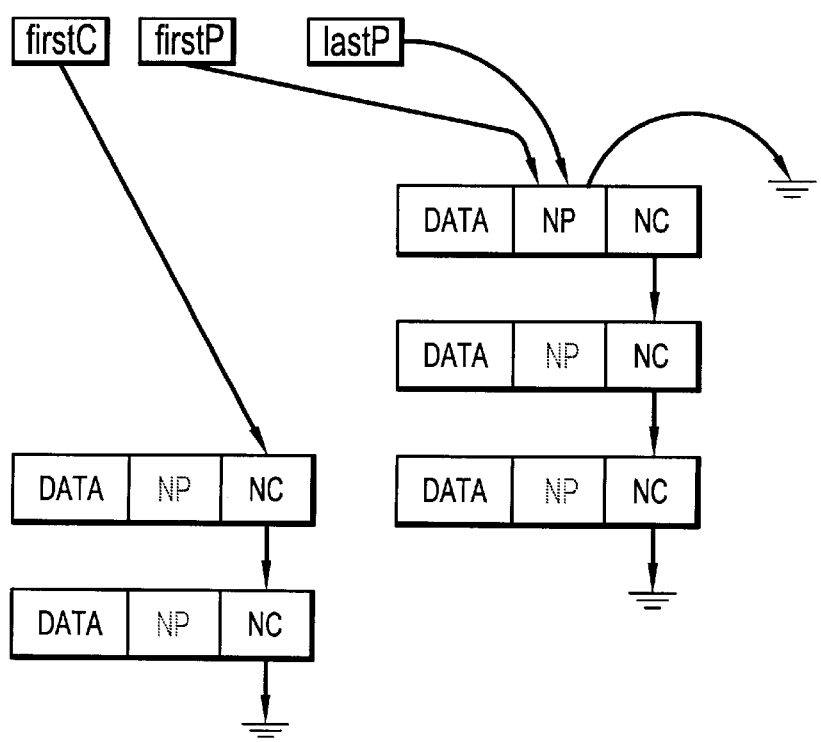
FIG. 5 shows the structure of the output port queue of FIG. 4 after two chunks have been read.

The present invention is a replication method that requires only one copy of the packet to be transmitted from the input port, and a method which acquires the deadlock-avoidance advantages of virtual cut-through operation. This goal is achieved via the central buffer, with replication occurring during the read of the chunk out of the central buffer by the output ports.

In this single-copy replication method, the input port writes each chunk into the central buffer once, but also initializes an associated counter c to $k_s$, where $k_s$ is the degree of replication required at that switch. When an output port reads the chunk from the central buffer, it checks c. If c=1, then the chunk is thrown away. Otherwise, c is decremented.

The relatively large size of a chunk minimizes the impact of adding a counter c to the storage space for each central buffer chunk.

The multiple-flit size of a chunk provides another striking advantage for this method: an input port can write a multi-destination packet into the central buffer at full bandwidth, while simultaneously all $k_s$ output ports are reading the packet at full bandwidth. Thus latency and required buffer space are minimized. We have established the motivation for the single-copy replication method; in the next section we examine the implementation issues.

Replication Implementation

In this section we describe modifications to the basic buffer wormhole strategy that provide efficient single-copy replication.

The basic change is to provide a counter, c, with each chunk that indicates the number of output ports that have not yet read the chunk from the central buffer, as introduced in the preceding section. (An implementation need not strictly follow this convention. For instance, c could initially be set to $k_s-1$, in which case if c=0 then the last output port is reading the chunk. This choice might allow c to be implemented with 1 less bit.) However, there remains a problem with the next-packet lists.

If a single header chunk is written to the central buffer, then there exists only a single next-packet pointer associated with this header chunk. Therefore, even if the last-packet and appropriate next-packet pointers are updated for every destination output port, the next-packet lists will be converged, an unacceptable situation.

A similar possible solution, for a multicast packet being replicated to $k_s$ ports, is to utilize the first $k_s$ written chunks for storing the $k_s$ separate next-packet pointers, one for each output port involved. This method requires some way to determine to which output port each pointer belongs. This determination could be made by adding a next-packet-port field to each chunk. This method causes other complications. If the multicast packet was shorter than $k_s$ chunks, should it be padded at the source, or padded with dummy chunks at each switch? How does the switch handle the arrival of another packet (unicast or multicast) destined for one of the involved output ports, and before that port's next-packet pointer has been written? Lastly, although it requires only one write for the header chunk, up to $k_s$ next-packet pointers must be updated (if all output ports already have packets waiting within the central buffer).

Figure 6:
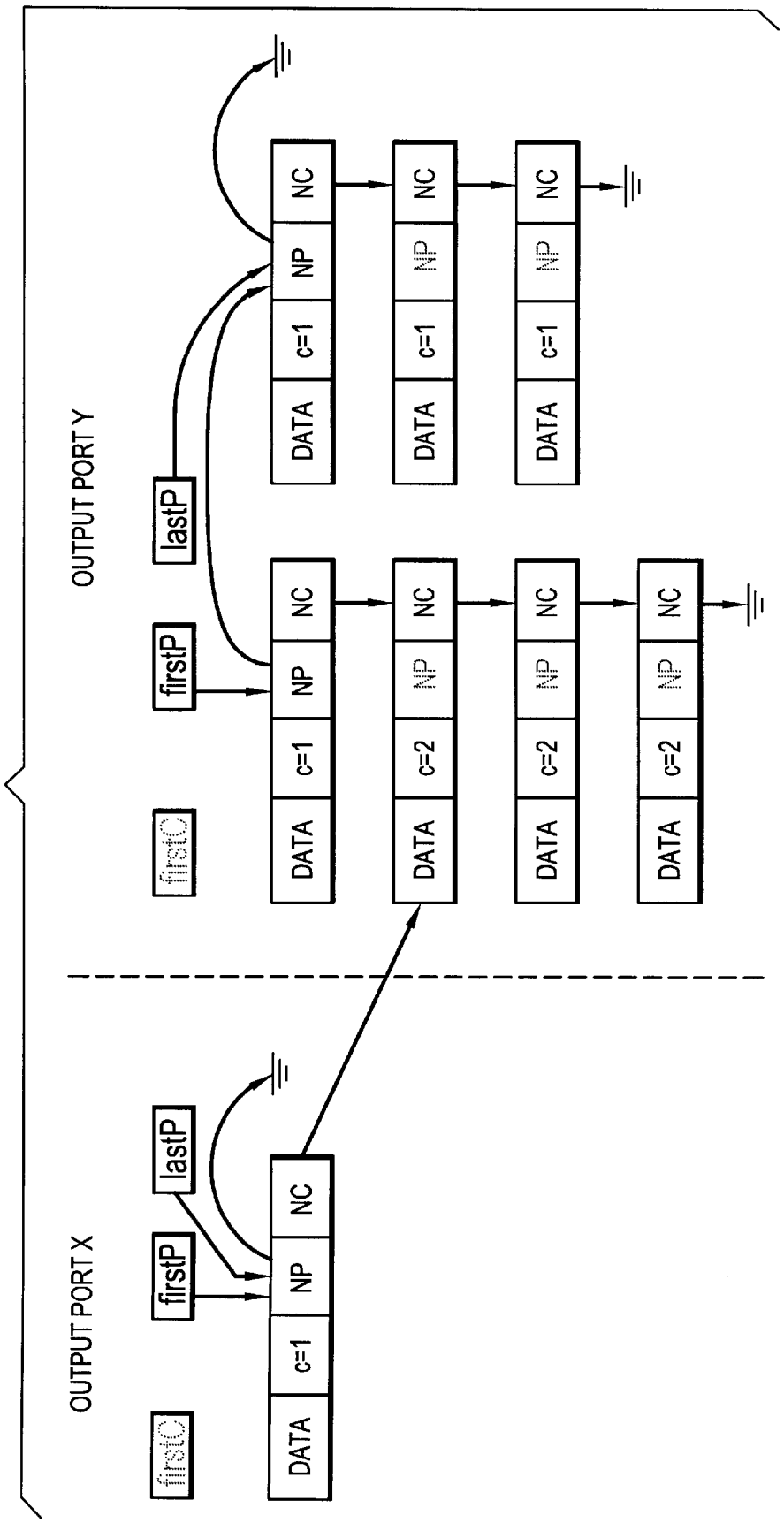
FIG. 6 shows replicated header chunks pointing to the same second chunk.

One solution is to write $k_s$ copies of the header chunks, one for each destination output port. This immediately provides a distinct next-packet pointer for each queue, maintaining their disjoint nature. All other chunks of the multidestination packet are written once. This method requires $k_s-1$ more chunks of central buffer space. One complication: each header chunk's next-chunk pointer must be updated when the second chunk of the packet is written required up to $k_s$ cycles for the second chunk write. FIG. 6 illustrates this solution. Output ports x and y share the same packet at the start of their queues, yet their next-packet lists remain separate.

Emulating Virtual Cut-through

As explained before, the equivalent of virtual cut-through (VCT) operation is required to avoid the dependence between output ports which can lead to multicast deadlock. VCT designs perform flow-control on a packet basis, allowing transmission of a packet from a switch only when the entire packet can be buffered at the downstream switch or node. Wormhole flow-control designs can be augmented to provide the aspects of VCT that are essential for multicasting, given sufficient buffering capability within each switch. To use a central buffer for emulating VCT, the total central buffer size must be as large or larger than the largest packet to be buffered.

When a multicast packet is replicated at a switch, each chunk of this packet must be stored in the central buffer before being read by all destination output ports. The packet header chunk is not allowed to enter the central buffer until there is a guarantee that the entire packet will eventually obtain space within the central buffer. This does not necessarily require that space for the entire packet exists prior to writing the header chunk. (If the designer can identify cases in which chunks currently within the central buffer are guaranteed to be read and freed, then these chunks may be able to be counted toward the available buffer space. These cases will vary from design to design and may also be topology-dependent.) When the header chunk is written (at least before any other chunk from any input port is subsequently written) the required number of chunks are reserved for use by that multicast packet only. In designs that maintain a "free chunk counter," this is most easily accomplished by decrementing the free space count by the total number of multicast packet chunks to be written.

To summarize, although the normal wormhole switch-to-switch flow-control is used between switches, the multicast packet header chunk is prevented from entering the central buffer until the entire multicast is guaranteed to fit within this buffer. This is a weaker requirement than VCT, and is only applied to multicast packets which are to be replicated within that switch.

What is claimed is:

1. A method for replicating a packet within a switching unit utilizing wormhole flow control, comprising the steps of:
   a) receiving a single copy of a packet to be replicated to an output port or ports, the single copy of a packet including data and destination address information, wherein the single copy of a packet is handled as a series of subpacket units, defined as chunks;
   b) storing the chunks of the single copy of a packet in a buffer, wherein each chunk is associated with a next chunk pointer, a next packet pointer, and a replication counter;
   c) notifying each target output port that the single copy of a packet is destined for the target output port;
   d) replicating the single copy of a packet to each target output port when the target output port is available; and
   e) when the single copy of a packet has been replicated to all target output ports, deleting the single copy of a packet from the buffer, wherein each time the chunk is replicated to the target output port, the replication counter is adjusted, when the replication counter reaches a predetermined count the chunk is deleted from the buffer.

2. The method of claim 1, wherein the next chunk pointer points to a next chunk within the same packet.

3. The method of claim 1, wherein the next packet pointer points to a next packet destined for the same output port as the present packet, this pointer being valid only for a first chunk in a packet.

4. The method of claim 1, wherein the replication counter represents the number of output ports that will read the chunk before it is deleted.

5. The method of claim 1, wherein the step of b) further comprises the steps of:
   a) where the chunk is a first chunk in the packet, setting the replication counter to 1;

b) otherwise, setting the replication counter to the number of the target output ports the chunk will be forwarded to.

6. The method of claim 1, further comprising the step of writing a first chunk of the packet once for each target output port to which the packet is destined.

7. The method of claim 6, wherein when a second chunk of the packet is written to the buffer, a next chunk pointer of the first chunk is updated to point to the second chunk.

8. The method of claim 7, wherein for any subsequent chunks, the next pointer of the previous chunk is updated to point to the subsequent chunk.

9. The method of claim 1, wherein the step of b) comprises the steps of:

if the chunk is a first chunk of the packet, updating a last packet pointer of the target output port to point to the chunk;

also, if the chunk is a first chunk to be written to the output port, then updating a first packet pointer of the output port to point to the chunk;

if the chunk is not the first chunk to be written to the output port, leaving the first and last packet counters unchanged.

10. The method of claim 1, further comprising the step of, when the output port reads each chunk out of the buffer, writing the next chunk pointer of the read chunk to a first chunk pointer of the output port.

11. The method of claim 1, wherein the step d) further comprises the step of:

when the output port is reading a first chunk of the packet, reading the chunk pointed by a packet pointer of the output port;

else, reading the chunk pointed by a first chunk pointer of the output port.

12. The method of claim 1, wherein step b) comprises insuring that the buffer has or will have sufficient space to store the entire packet.

13. The method of claim 12, further comprising the step of:

maintaining a count of the number of available chunks within the buffer;

if the count is greater than the number of chunks required, then decrementing the counter by the number of chunks in the packet;

else, waiting until the count increases.

14. A system for replicating a packet within a switching element using wormhole routing flow-control, the switching element comprising:

a shared central buffer for storing blocked packet data, the shared central buffer comprising:

a plurality of chunk storage units, each chunk storage unit defines a chunk including:

a data buffer for storing data elements of a single copy of a packet;

means for determining in which chunk a next data element of the single copy of a packet is stored;

means for determining in which chunk a first data element of the single copy of a packet is stored;

a counter indicating the number of copies of the data elements that are represented by the chunk;

a plurality of input ports, each input port including a pointer for indicating the chunk holding a last data element to be written by the input port;

a plurality of target output ports, each target output port including:

a) pointers to the first and last data elements stored in chunks;

b) a pointer to a next chunk to be retrieved for a current single copy of a packet;

means for replicating said single copy of a packet data element from said data buffer to each one of said plurality of target output ports as each one of said plurality of target output ports become available; and means for deleting the chunk storage units.

15. A system for replicating a packet within a switching unit utilizing wormhole flow control, comprising:

means for receiving a single copy of a packet to be replicated to an output port or ports, the single copy of a packet including data and destination address information;

means for handling the single copy of a packet as a series of subpacket units, defined as chunks;

means for storing the chunks of the single copy of a packet in a buffer, wherein each chunk is associated with a next chunk pointer, a next packet pointer, and a replication counter;

means for notifying each target output port that the single copy of a packet is destined for the target output port;

means for replicating the single copy of a packet to each target output port when the target output port is available;

means for adjusting said replication counter each time a chunk is replicated to a target output port;

means for deleting the single copy of a packet from the buffer when the single copy of a packet has been replicated to each target output port.

16. The system of claim 15, wherein the means for storing the packet in a buffer comprises means for insuring that the buffer has or will have sufficient space to store the entire packet.

17. The method of claim 16, wherein the means for insuring that the buffer has or will have sufficient space to store the entire packet comprises:

means for maintaining a count of the number of available chunks within the buffer;

means, if the count is greater than the number of chunks required, for decrementing the counter by the number of chunks in the packet; else, for waiting until the count increases.

* * * * *